US012555937B2

(12) United States Patent
Cantle et al.

(10) Patent No.: US 12,555,937 B2
(45) Date of Patent: Feb. 17, 2026

(54) CONNECTOR HOLDER FOR BYPASS CONNECTION APPLICATIONS

(71) Applicant: MOLEX, LLC, Lisle, IL (US)

(72) Inventors: Allan Cantle, Westlake Village, CA (US); Robert Dillman, Santa Clara, CA (US)

(73) Assignee: Molex, LLC, Lisle, IL (US)

(*) Notice: Subject to any disclaimer, the term of this patent is extended or adjusted under 35 U.S.C. 154(b) by 328 days.

(21) Appl. No.: 18/033,811

(22) PCT Filed: Nov. 1, 2021

(86) PCT No.: PCT/IB2021/060084
§ 371 (c)(1),
(2) Date: Apr. 26, 2023

(87) PCT Pub. No.: WO2022/091053
PCT Pub. Date: May 5, 2022

(65) Prior Publication Data

US 2023/0396007 A1 Dec. 7, 2023

Related U.S. Application Data

(60) Provisional application No. 63/108,445, filed on Nov. 2, 2020.

(51) Int. Cl.
*H01R 13/74* (2006.01)
*H01R 12/71* (2011.01)
(Continued)

(52) U.S. Cl.
CPC ......... *H01R 12/722* (2013.01); *H01R 12/716* (2013.01); *H01R 12/75* (2013.01)

(58) Field of Classification Search
CPC .... H01R 12/722; H01R 12/716; H01R 12/75; H01R 12/7023; H01R 13/6315; H01R 13/743
See application file for complete search history.

(56) References Cited

U.S. PATENT DOCUMENTS 4,820,180 A 4/1989 Mosquera et al.
4,988,308 A * 1/1991 Toedtman .......... H01R 13/6315 248/27.3
(Continued)

FOREIGN PATENT DOCUMENTS

DE 7208075 U 6/1972
JP H05275868 A 10/1993
(Continued)

OTHER PUBLICATIONS

International Preliminary Report on Patentability received for PCT Application No. PCT/IB2021/060084, mailed on May 11, 2023, 10 pages.
(Continued)

*Primary Examiner* — Abdullah A Riyami
*Assistant Examiner* — Nelson R. Burgos-Guntin

(57) ABSTRACT

A connector holder includes a housing (configured to be secured within an aperture in a substrate), a first connector disposed within the housing and configured to provide a mating interface that extends above the support member and a cable that is connected to the connector and extends below the support member. The first connector is used to provide electrical connection with an associated electrical component and can provide for blind mating.

20 Claims, 16 Drawing Sheets

(51) Int. Cl.
*H01R 12/72* (2011.01)
*H01R 12/75* (2011.01)

(56) References Cited

U.S. PATENT DOCUMENTS 5,514,000 A * 5/1996 Krause ................. H01R 13/743
439/248
6,736,659 B1 * 5/2004 Wu ...................... H01R 13/748
439/573
7,168,978 B1 * 1/2007 Trout ................... H01R 13/743
439/545
7,607,930 B1 * 10/2009 Wu ...................... H01R 13/745
439/378
8,932,071 B2 * 1/2015 Venema ................. H01R 13/62
439/248
9,173,304 B2 * 10/2015 French, Jr. ............. H05K 3/368
10,739,828 B2 * 8/2020 Reed .................... H05K 7/1487
11,329,431 B2 * 5/2022 Pao .................... H01R 13/6315
2004/0094328 A1 5/2004 Fjelstad et al.
2005/0075002 A1 * 4/2005 Kubo ................... H01R 13/741
439/357
2020/0153135 A1 * 5/2020 Rossman ............. H01R 12/722
2020/0274267 A1 * 8/2020 Zerebilov ............ H01R 13/502
2021/0126404 A1 * 4/2021 Laurx ................ H01R 13/6471

FOREIGN PATENT DOCUMENTS

JP H06203923 A 7/1994
JP H09283225 A 10/1997
JP 2002170635 A 6/2002
JP 2005093270 A 4/2005
JP 2016136492 A 7/2016
JP 2019071200 A 5/2019
JP 2020013690 A 1/2020

OTHER PUBLICATIONS

International Search Report and Written Opinion received for PCT Application No. PCT/IB2021/060084, mailed on Feb. 1, 2022,13 pages.

* cited by examiner

CONNECTOR HOLDER FOR BYPASS CONNECTION APPLICATIONS

CROSS-REFERENCE TO RELATED APPLICATION

This application is a national phase of PCT/IB2021/060084, filed on Nov. 1, 2021, which claims priority to U.S. Provisional Application 63/108,445, filed Nov. 2, 2020, both of which is are incorporated herein by reference in its their entireties.

TECHNICAL FIELD

This disclosure relates to the field of electrical connectors, more specifically to connectors suitable for use in high data rate applications.

INTRODUCTION

Electrical connectors used in high data rate applications are typically designed to meet strict requirements in both the electrical and mechanical domains. High speed or high data rate electrical connectors are often used in, for example, backplane applications that require very high conductor density and high data rates.

Bypass connector systems are known to provide a connection between an input/output (IO) connector and an application specific integrated circuit (ASIC) or other integrated circuit (IC)-type device. One common configuration is to have a first connector (typically an IO connector) positioned at a face panel of a box, while having a second connector that mates to a circuit board (or another connector) near the ASIC with the first and second connectors connected via a cable. As known, the cable is much less lossy than standard circuit boards and the use of a cable substantially decreases the loss between the first and second connectors. Thus, certain individuals would appreciate a bypass-like connector system that would allow even greater flexibility in interconnections with and between IC-type devices, particularly as used in high data rate applications.

SUMMARY

In an embodiment, a connector holder for supporting an electrical connector assembly within an aperture formed in a support member is provided. The connector assembly is formed of a housing (configured to be secured within the aperture), a first connector disposed within the housing to extend above the support member and a connection module that is coupled to the first connector and extends below the support member. The first connector is used to provide electrical connection with an associated electrical component and the connection module includes cables that extend along the underside of the support member and provide signal path interconnections to the associated electrical component. In an embodiment, the housing may include a plurality of holding clips (e.g., lever arms) for securing the connector holder within the aperture. Disclosed embodiments of the connector holder may also utilize a plurality of locating pins for facilitating alignment of one or more second connectors with the first connector, where the connector holder may be formed to include a plurality of apertures formed in the first connector and positioned to accept the plurality of locating pins. A biasing member may be included in a disclosed embodiment to provide an upward spring force against the first connector for maintaining contact with the external electrical component.

In another embodiment, an electrical interconnection assembly is provided for creating data path interconnections between electronic ICs, at least some of which are mounted on a circuit board. The electrical interconnection assembly is based upon a plurality of connector holder assemblies, formed in the manner described above, that are disposed within a plurality of apertures formed through the thickness of the circuit board. In this case, at least one cable from a first connector holder of the plurality of connector holder assemblies is connected to a cable of a second connector holder of the plurality of connector holder assemblies, providing data paths between a first IC mounted on the first connector holder and a second IC mounted on the second connector holder.

BRIEF DESCRIPTION OF THE DRAWINGS

The present disclosure is illustrated by way of example and not limited to the accompanying figure in which like reference numerals refer to like elements and in which.

DETAILED DESCRIPTION, INCLUDING EXEMPLARY EMBODIMENTS

Simplicity and clarity in both illustration and description are sought to effectively enable a person of skill in the art to make, use, and best practice embodiments disclosed herein in view of what is already known in the art. One skilled in the art will appreciate that various modifications and changes may be made to the specific embodiments described herein without departing from the spirit and scope of the disclosure. Thus, the specification and drawings are to be regarded as illustrative and exemplary rather than restrictive or all-encompassing, and all such modifications to the specific embodiments described herein are intended to be included within the scope of the disclosure. Yet further, it should be understood that the detailed description that follows describes exemplary embodiments and is not intended to be limited to the expressly disclosed combination(s). Therefore, unless otherwise noted, features disclosed herein may be combined together to form additional combinations that were not otherwise described or shown for purposes of brevity.

It should also be noted that one or more exemplary embodiments may be described as a method. Although a method may be described as an exemplary sequence (i.e., sequential), it should be understood that such a method may also be performed in parallel, concurrently or simultaneously. In addition, the order of each formative step within a method may be re-arranged. A described method may be terminated when completed, and may also include additional steps that are not described herein if, for example, such steps are known by those skilled in the art.

As used herein, the term "embodiment" or "exemplary" mean an example that falls within the scope of the disclosure.

FIGS. 1-6 illustrate an exemplary connector holder 10 formed in accordance with this disclosure to provide interconnection between various ICs that may be included on a substrate. In some exemplary embodiments, connector holder 10 may provide "underboard" interconnection from one IC or another via cable connections from one connector holder to another. In other exemplary embodiments, connector holder 10 may provide underboard connection between an IC mounted on a circuit board and external components (external to the circuit board, that is). In some cases, both types of connections may be provided by different connector holders that are mounted on a common substrate. As will be discussed in detail below, an exemplary connector holder formed in accordance with this disclosure may include a cable that is disposed below the substrate and allows for a low-profile, right-angle underboard cable exit path.

Figure 1:
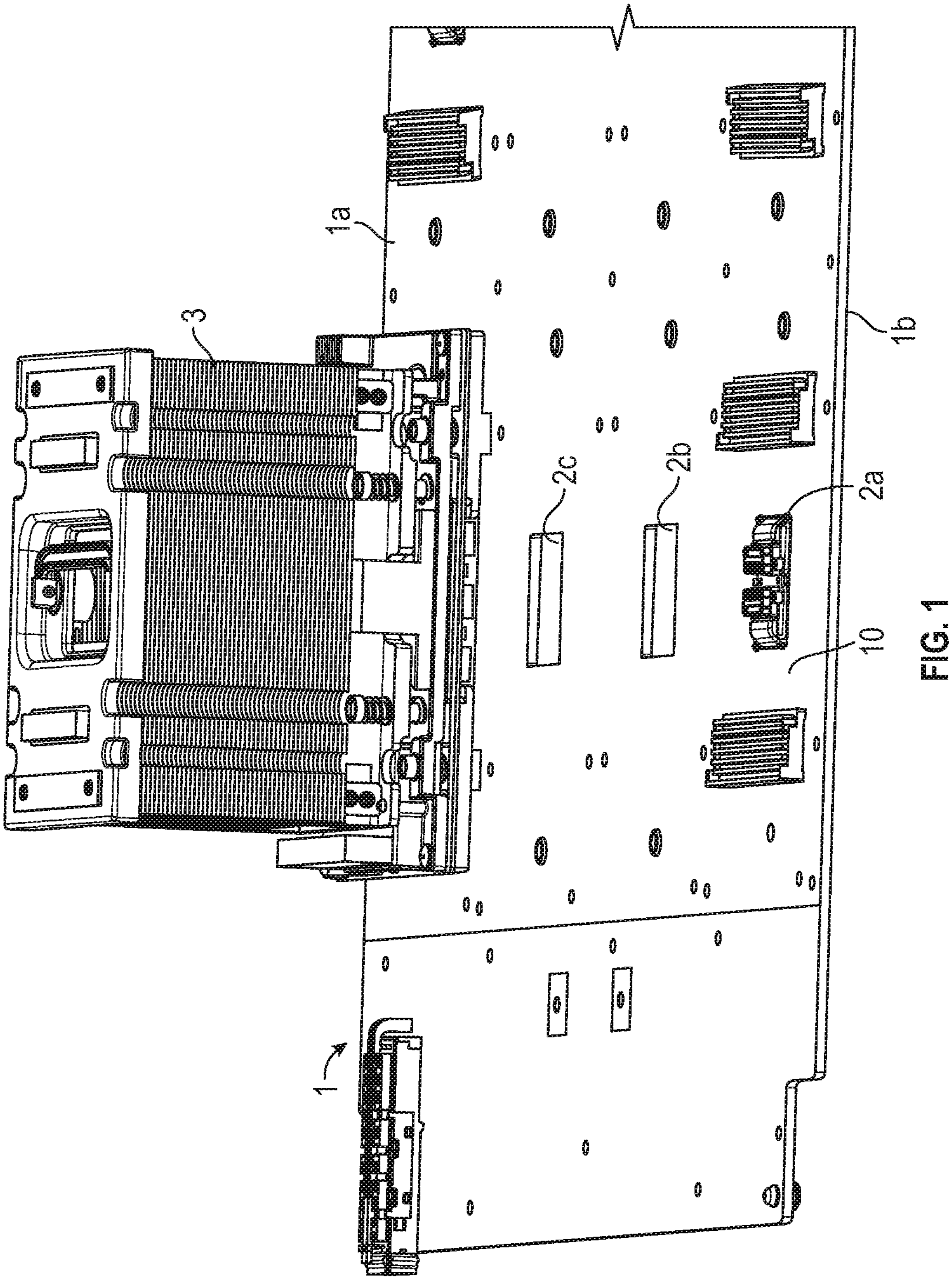
FIG. 1 is an isometric view of an embodiment of a connector holder positioned within a conventional circuit board.

With specific reference to FIG. 1, a connector holder 10 is shown as positioned within an aperture 2*a* formed through the thickness of a substrate 1. Substrate 1 is of prior art configuration and can be a conventional circuit board, but it is to be understood that connector holder 10 as disclosed herein may be used with various other types of substrates, mounts, supports, and the like, to facilitate electrical interconnection between mating connectors, including frames and any other suitable support material. An exemplary embodiment of a connector holder formed in accordance with the present disclosure includes a housing that supports a first connector (used for mating with an associated mating connector). Additional apertures 2*b*, 2*c*, are shown on substrate 1, where similar connector holders formed in accordance with this disclosure may be positioned within these additional apertures. Naturally, a suitable system may have one or more connector holders, depending on the design of the system. Connector holder 10 may be configured such that the specific components of the holder allow for sufficient X-direction and Y-direction movement of connector holder 10 with respect to top surface 1*a* of substrate 1. That is, connector holder 10 may be configured to "float" in the X and Y directions (within the boundaries of aperture 2*a*) in a manner that provides a useful tolerance in connecting various external circuits to the disclosed connector holder 10 so as to permit a blind mating operation. Typically the X and Y directions are parallel with a surface of the substrate and are perpendicular to the mating direction. Also shown in FIG. 1 is an example of an application specific integrated circuit (ASIC) module 3 that may be attached to substrate 1 and connected to a connector supported by a connector holder 10 (not evident in this view, but shown in following FIG. 6, for example). Connector holders 10 may be formed of various dimensions and, similarly, apertures 2 may be formed of particular dimensions suitable to accommodate the various connector holder geometries.

Figure 2:
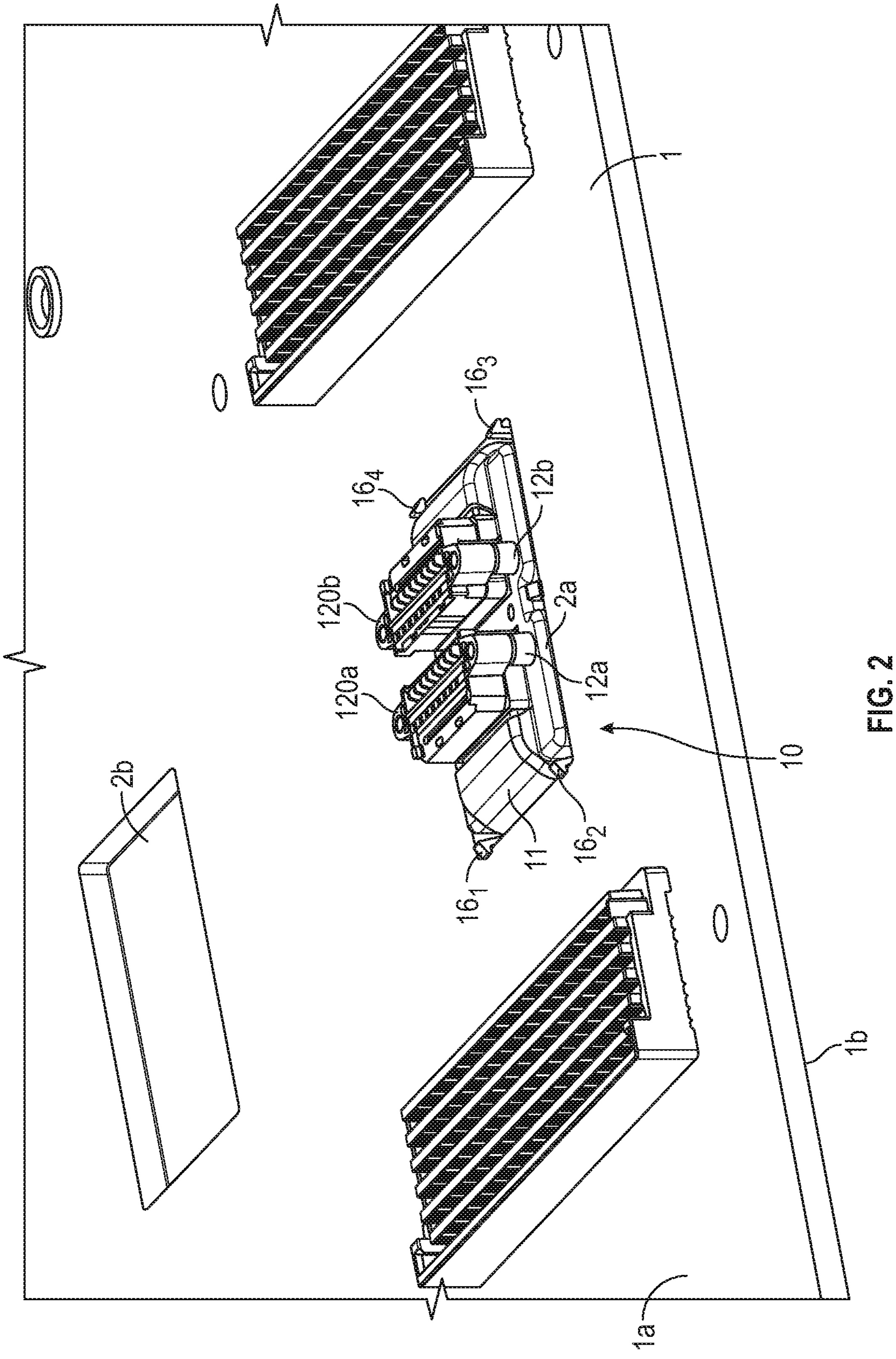
FIG. 2 is an enlarged view of a portion of FIG. 1, illustrating particular elements of the disclosed connector holder.
Figure 3:
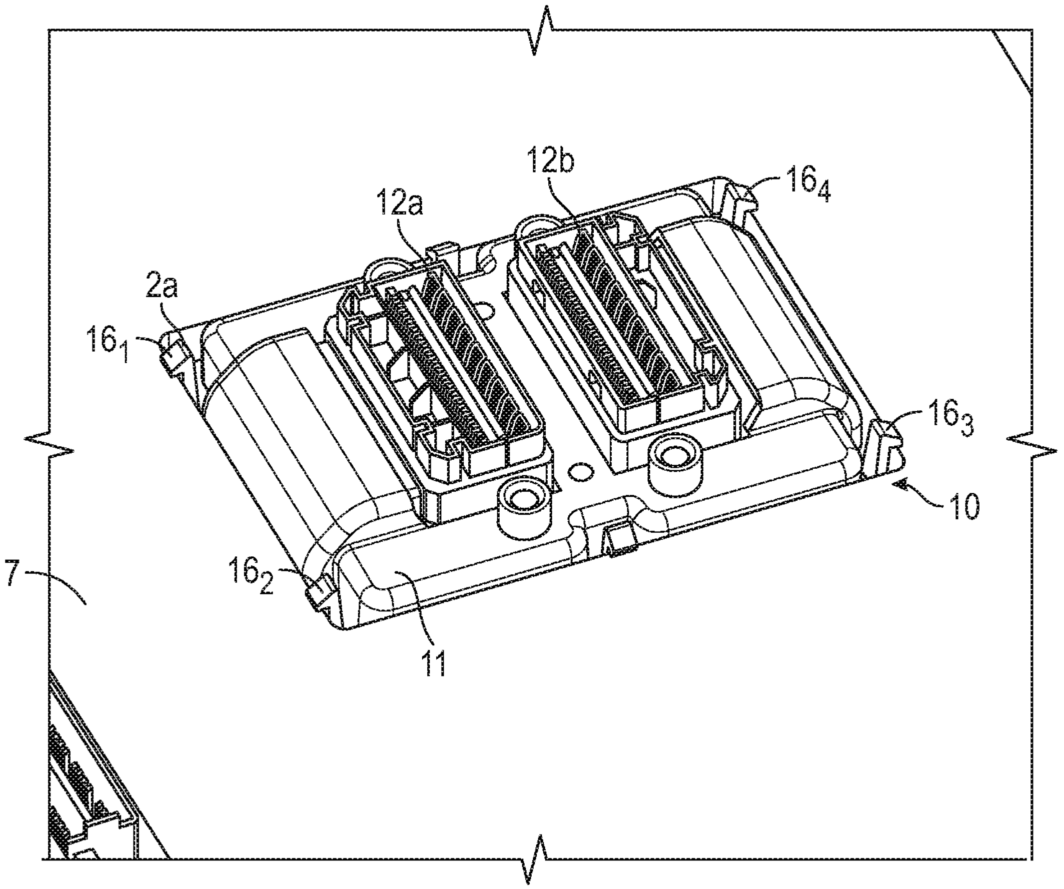
FIG. 3 is a close-up isometric view of an exemplary connector holder.

FIG. 2 is an enlarged view of a portion of the arrangement of FIG. 1, illustrating connector holder 10 in somewhat more detail, and FIG. 3 is a close-up isometric top view of connector holder 10 as well. Connector holder 10 is illustrated in FIGS. 2 and 3 as disposed within aperture 2*a* that is formed through the thickness of substrate 1. Connector holder 10 includes a housing 11, which may be formed of an insulative material and is shown in FIGS. 2-3 as further comprising a pair of first connectors 12*a*, 12*b* that may be disposed within housing 11 and arranged to interconnect with a specific second connector assembly (such as a connector assembly that is used with ASIC 3). FIG. 2 in particular illustrates a pair of second connectors 120*a*, 120*b* that may be aligned to and mated with first connectors 12*a*, 12*b*. As can be appreciated from the depicted embodiments, second connectors 120*a*, 120*b* can be mounted on (or connected to) an IC (as shown by ASIC module 3) and thus provide a connection between first connectors 12*a*, 12*b* and the corresponding IC. It should be noted that while the depicted connector holder supports two connectors, an exemplary connector holder may support one or more connectors as desired, keeping in mind the practical limits of insertion forces and alignment tolerances. Also shown in FIGS. 2-3 is a set of holding clips $\mathbf{16}_1$, $\mathbf{16}_2$, $\mathbf{16}_3$, and $\mathbf{16}_4$ that may form part of housing 11 and are used to secure connector holder 10 in place within aperture 2*a*. While a set of four holding clips is shown in the embodiment of FIG. 2, it is to be understood that other embodiments may use fewer or more clips (or some comparable type of securing arrangement) as desired, and may depend on the size and topology of the associated aperture, for example. Holding clips 16 may be formed as lever arm portions of housing 11, with the spring force of the lever arms sufficient to secure connector holder 10 in place within aperture 2*a*, yet allow for the sufficient X-Y movement desirable to relax the tolerance required for attaching a mating connector (such as connector 120) to connector holder 10.

Figure 4:
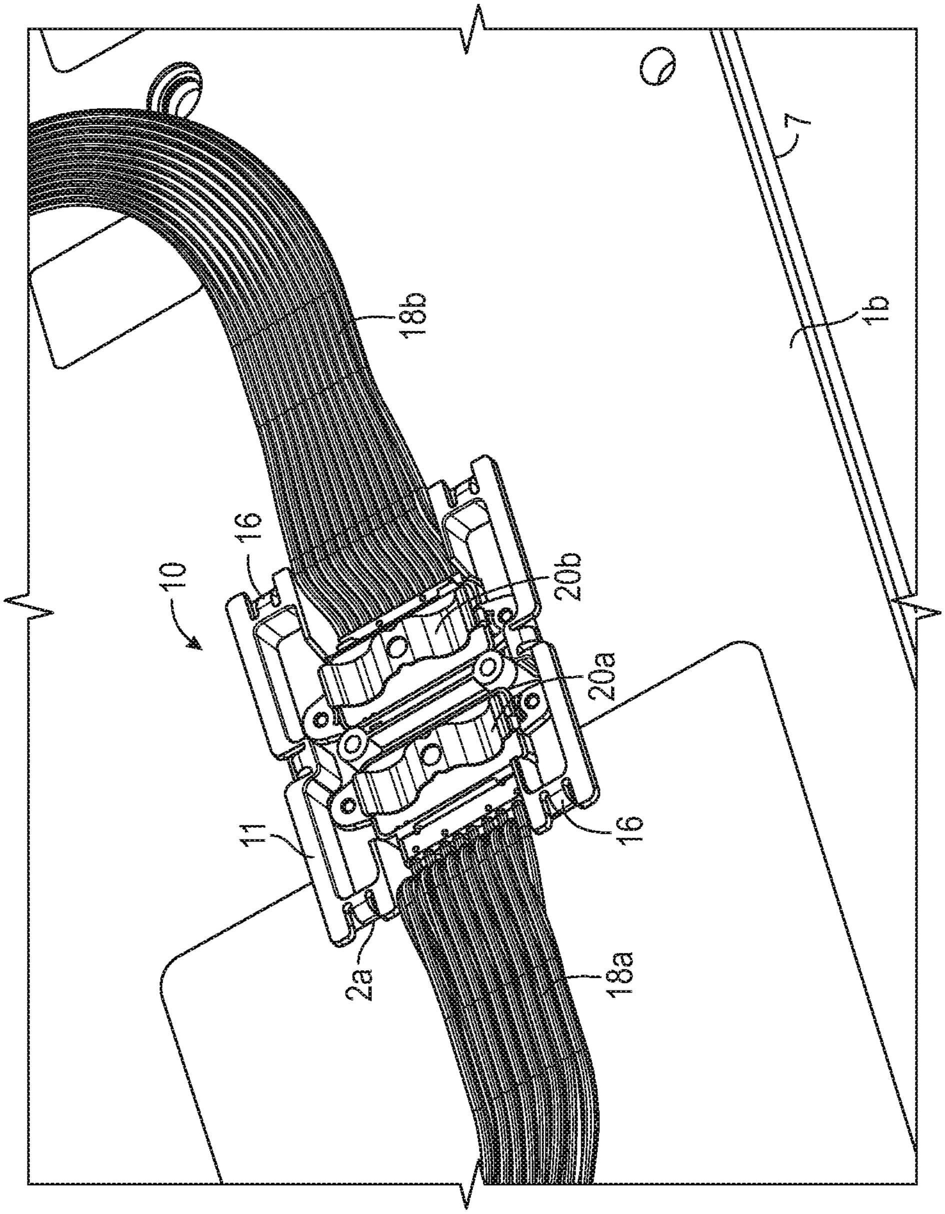
FIG. 4 is an underside view of the disclosed connector holder.

FIG. 4 is a view from the underside of connector holder 10 as in position on substrate 1, particularly illustrating a first plurality of cables 18*a* and a second plurality of cables 18*b* that may connect with terminals included within first connectors 12*a*, 12*b*, respectively. As shown below in FIG. 4, cables 18 are disposed to extend along the underside 1*b* of substrate 1 (i.e., forming underboard signal paths), and may connect to other connector holders 10 as positioned on substrate 1 or, alternatively, may extend to off-board connection arrangements. In some cases, cables 18 may be used to support the transmission of high speed data channels (e.g., 25 Gbps and above), and may be in a twinax cable configuration. As will be discussed in detail below, an aspect of a disclosed embodiment is the inclusion of a biasing element 20*a*, 20*b* within connector holder 10 that functions to urge first connectors 12 "upward" (i.e., in the Z-axis direction) to maintain contact with a mating second connector. FIG. 4 illustrates biasing element 20*a*, 20*b* (which are shown as leaf springs but may be any other desired configuration such as coil springs or a compressed material) positioned underneath first connectors 12*a*, 12*b*, respectively, that may be used to apply a biasing force against first connectors 12*a*, 12*b*. Naturally, a biasing element could also be positioned on the side of the first connector rather than below the first connector if so desired.

Figure 5:
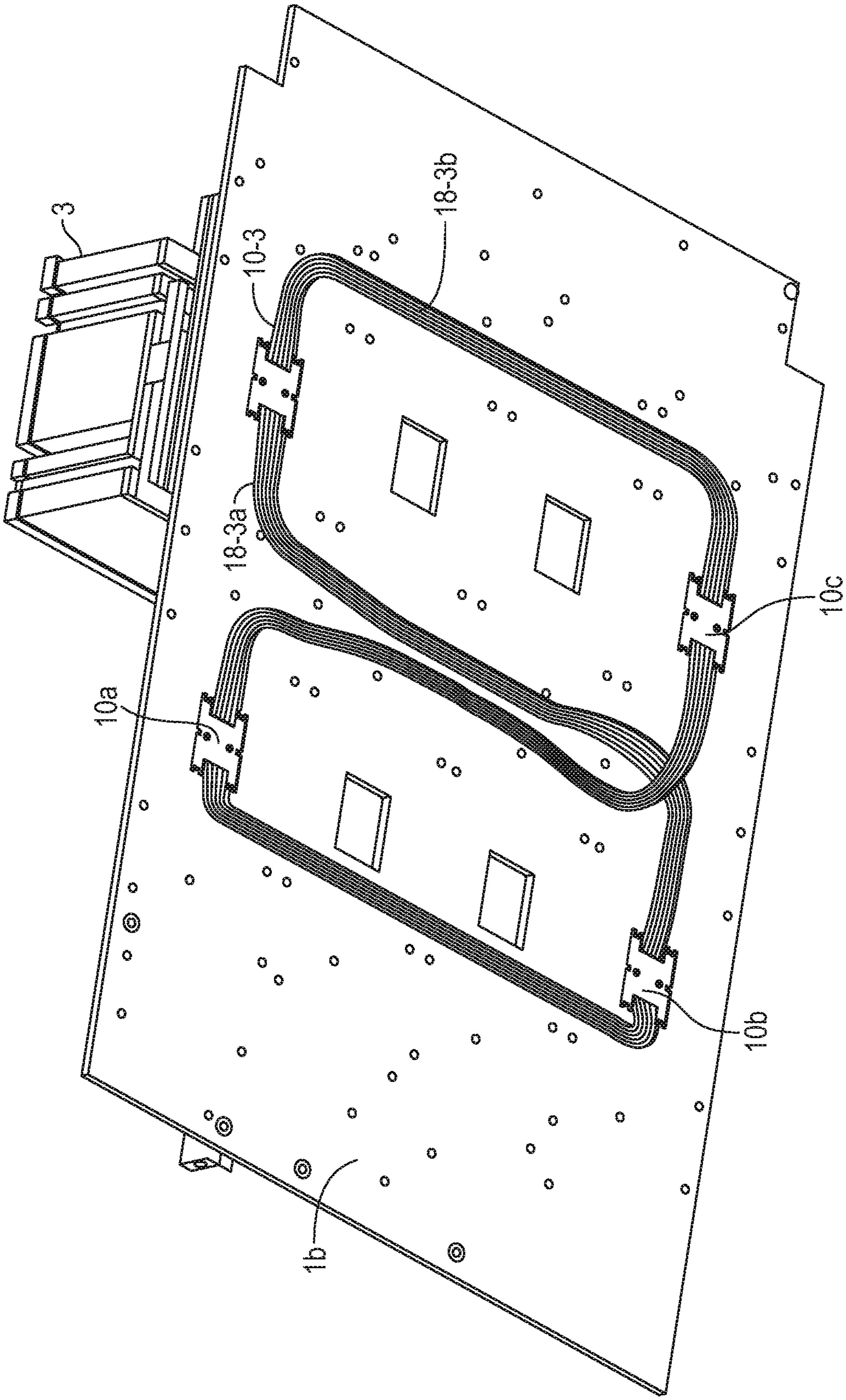
FIG. 5 is an underside isometric view of a circuit board as populated with several connector holders, illustrating the possibility of cable interconnections among and between the connector holders.

FIG. 5 is an isometric view from an underside 1*b* of substrate 1, illustrating in this simplified view an exemplary interconnection that may be formed between cables 18 associated with various connector holders 10. In this depiction, ASIC module 3 is illustrated as connecting to a first connector 12*a*, 12*b* included in connector holder 10-3 (the specific interconnection discussed below in association with FIG. 15). Cables 18-3*a* and 18-3*b* associated with ASIC module 3 are shown as passing along underside 1*b* of substrate 1, where cable 18-3*a* may be connected to a first connector 12 supported by connector holder 10*b* and cable 18-3*b* may be connected to a first connector 12 supported by connector holder 10*c*. This is merely one example of the type of underboard high-speed data connections that may be provided by using a connector holder formed in accordance with this disclosure.

Figure 6:
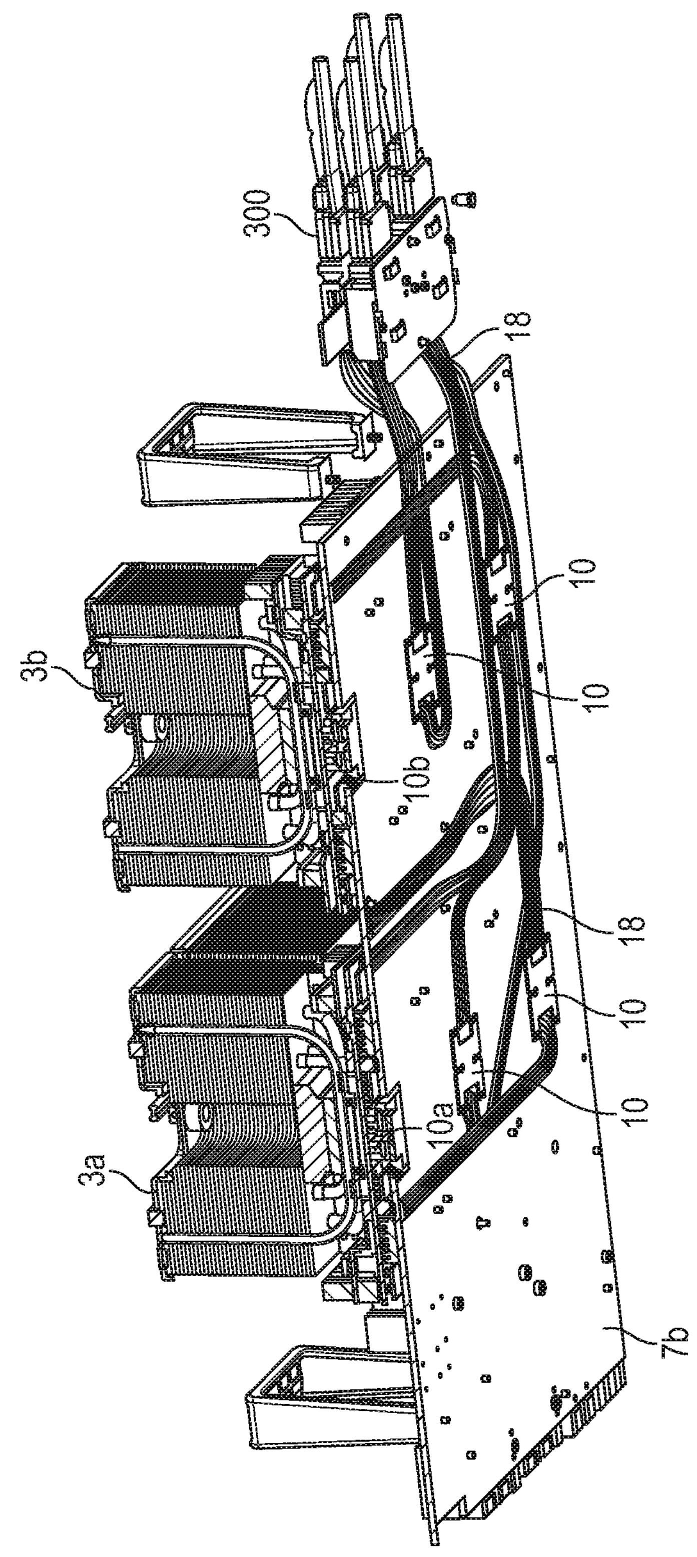
FIG. 6 is an underside isometric view of another embodiment of a connector holder, showing not only connections between connector holders, but also a cable connection to an external electronic circuit element.

FIG. 6 is a cross-section view of a slightly more detailed type of interconnection between multiple ASIC modules 3*a*, 3*b* and connector holders 10. Also shown in this embodiment of the disclosure is an off-board interconnector assembly component 300 that may be interconnected with ASIC modules 3*a*, 3*b* by using underboard cables 18. The embodiment of FIG. 6 illustrates an ability of the disclosed connector holder to enable high-speed data connections to various types of electronic circuit components, including both on-board (mounted) ICs and off-board elements. As will be discussed below in association with FIGS. 16 and 17, first connectors 12 may be used to provide interconnection to various types of circuit modules beyond individual ICs; that is, to interconnect with other circuit boards, cables, or the like.

Figure 7:
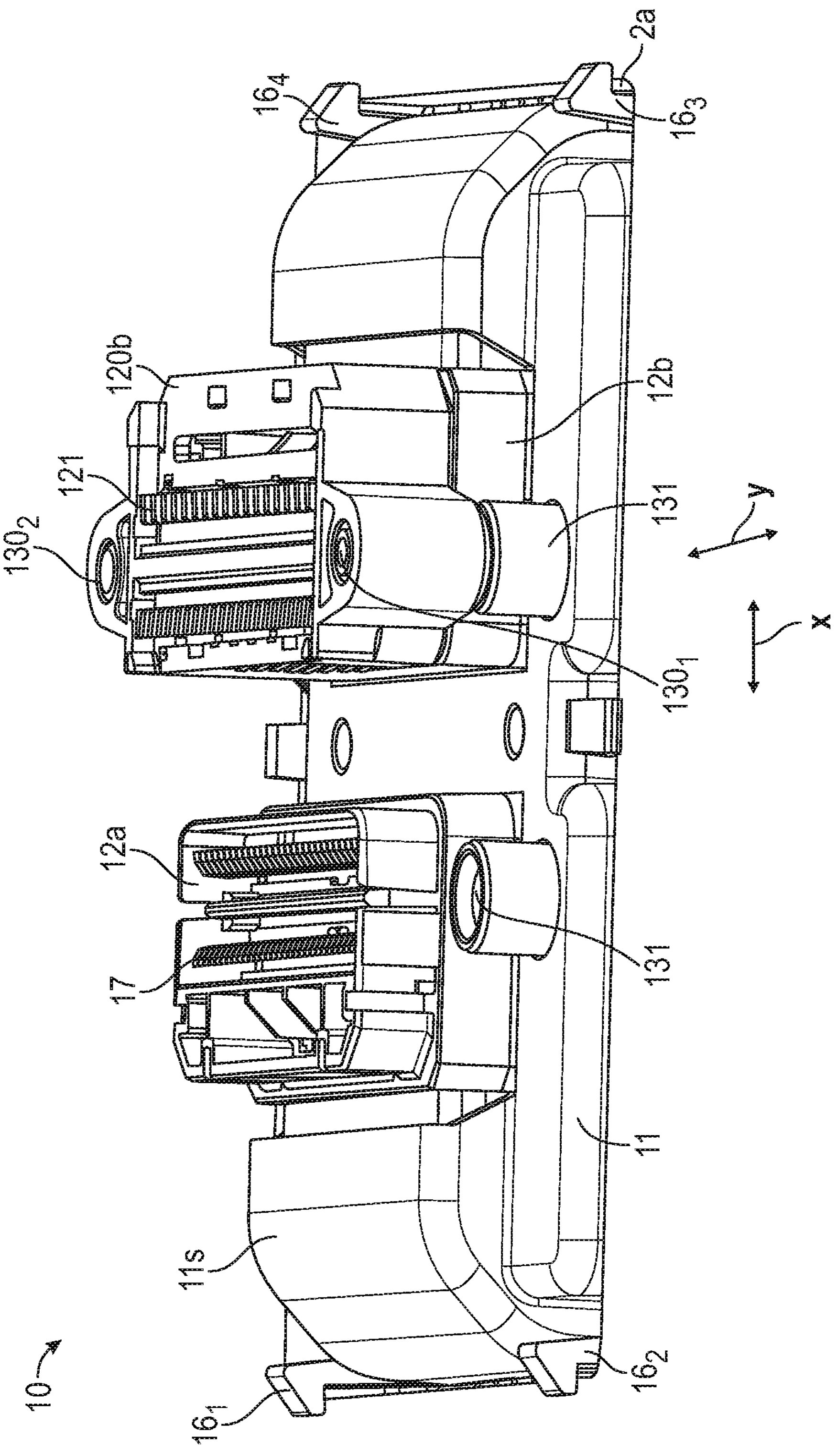
FIG. 7 is a detailed isometric view of an upper portion of the disclosed connector holder, including an attached to an external connector (such as a second connector)
Figure 8:
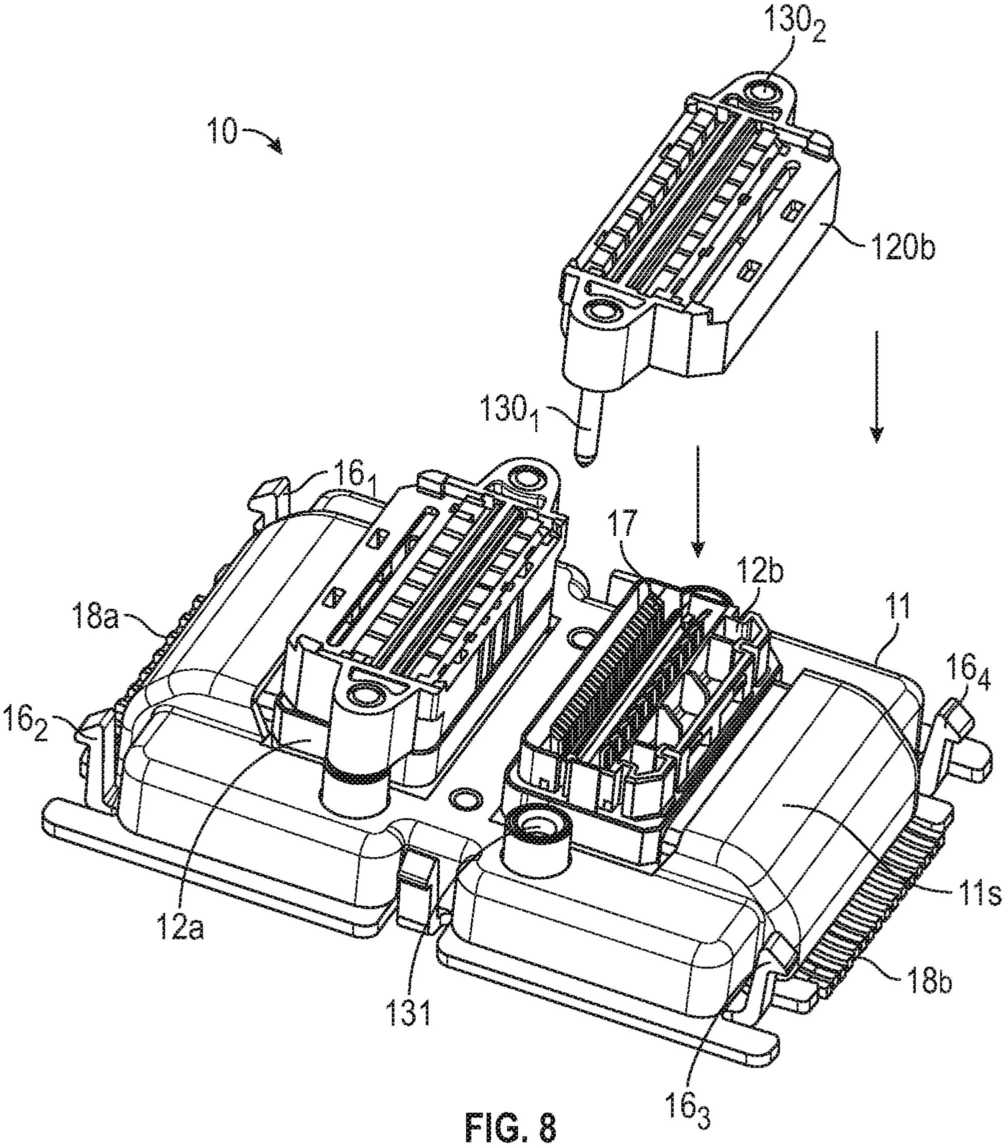
FIG. 8 is an exploded isometric view, similar to FIG. 7, showing an external connector in an unmated position.

A detailed isometric top view of an exemplary embodiment of connector holder 10 is shown in FIG. 7. In this view, a second 120*b* (that may be associated with an IC intended to be supported by substrate 1) is depicted as positioned in place over, and mated to, first connector 12*b* (which is positioned within connector holder 10), while first connector 12 is shown in an unmated arrangement. FIG. 8 is a similar view as that of FIG. 7, in this case an exploded view showing the direction of connection between second connector 120*b* and first connector 12*b*. Continuing with the description of both FIGS. 7 and 8, a pair of locating pins 1301, 1302 is shown and may be used with an exemplary second connector 120 to facilitate the proper aligned attachment of second connector 120 with first connector 12. When attaching second connector 120 to first connector 12, locating pins 130 may align with alignment apertures 131 formed in first connector 12 to assist in proper alignment and mating of the first and second connectors.

Also shown in FIGS. 7 and 8 are holding clips 16, which may be used to secure connector holder 10 within an aperture 2 of substrate 1. As best shown in FIG. 8, holding clips 16 may be formed as a portion of housing 11 and configured as lever arms that will "snap" in place around the periphery of aperture 2. It is possible to assemble connector holder 10 with substrate 1 by passing connector holder 10 upward from underside 1*b* of substrate 1 through an associated aperture 2 (as discussed above) so as to be positioned in place within aperture 2, with holding clips 16 engaging with the top surface 1*a* of substrate 1 to provide physical contact between connector holder 10 and substrate 1. By using holding clips 16 to mount connector holder 10 within aperture 2*a*, the holding clips can allow for a degree of X-Y adjustment of the positioning of connector holder 10 within aperture 2. Housing 11 is shown in FIG. 8 as including a lip 11*a* (labeled in FIG. 13) that is configured to engage the bottom surface of the substrate while the holding clips engage the top surface of the substrate and thus can control the location of the housing with respect to the substrate in the Z direction.

Figure 9:
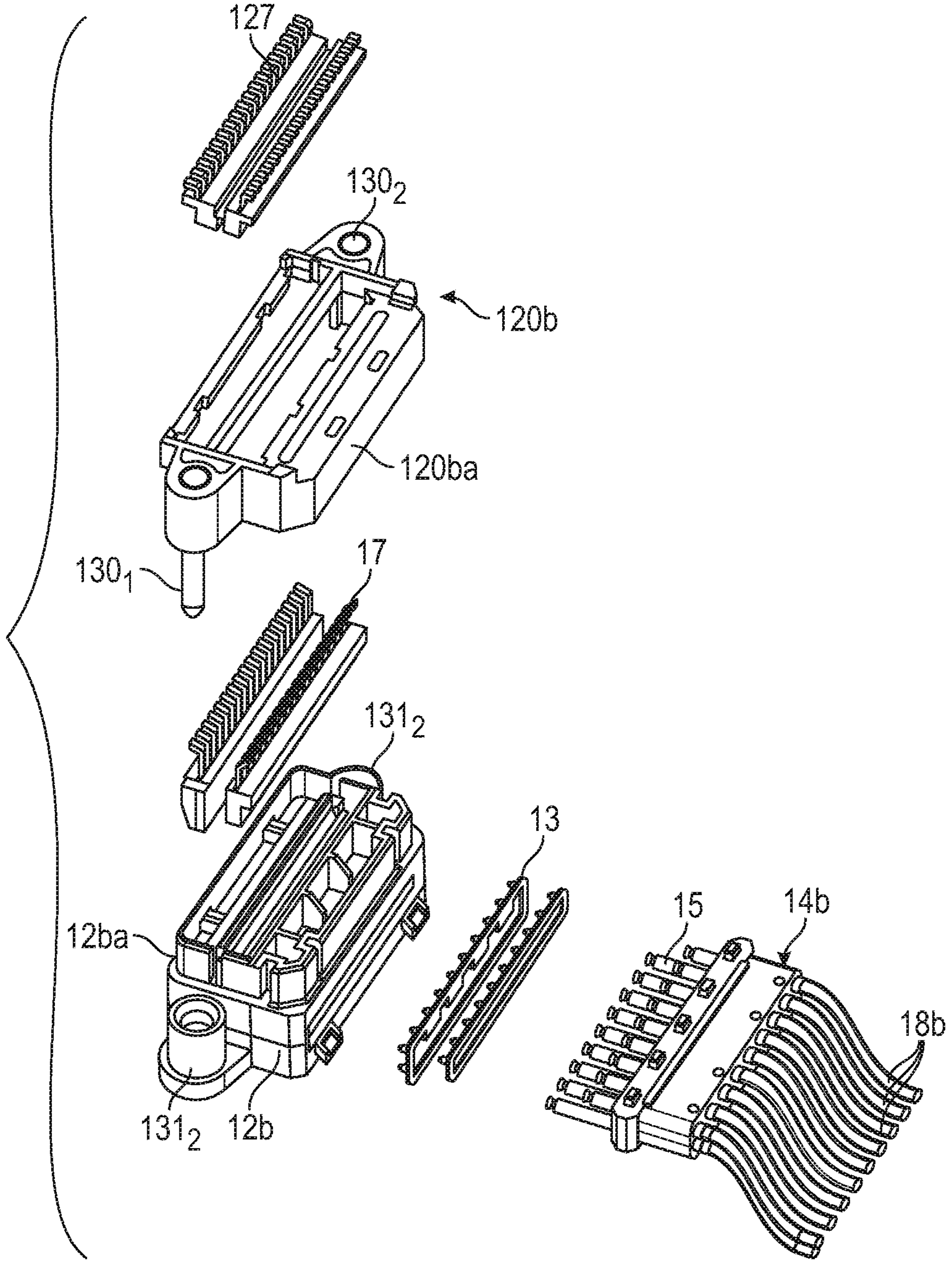
FIG. 9 is an exploded isometric view of an embodiment of a first connector and a second connector.

FIG. 9 is an exploded view of an embodiment of first connector 12*b* and a second connector 120*b*. The first connector 12*b* includes a first housing 12*ba* that supports first terminals 17. While second connector 120*b* includes a second housing 120*ba* that supports second terminals 127. First terminals 17 may engage with second terminals 127 upon mating of first connector 12*b* with second connector 120*b*. Shown in this view is locating pin 130 that is supported by second housing 120*ba*, where locating pin 130 is intended to engage an alignment aperture 131 (which is shown as formed in first housing 12*ba*) when joining second connector 120*b* to first connector 12*b*. While a pin and alignment aperture are useful, first housing 12*ba* and second housing 120*ba* could also be configured with appropriate chamfers and/or tapered features so that no additional elements are needed to provide an alignment feature to ensure mating when first connector 12*b* is blind mated to second connector 120*b*. Also shown in FIG. 9 is a set of connector frames 13 that help support the connection between conductors 12 and terminals 17.

A cable connection module 14*b* is also shown in FIG. 9, and may be used to help support cables 18, for example to provide strain relief and can help ensure that conductors 15 are properly aligned with the corresponding terminals 17 so they can be connected together. As can be appreciated, the depicted first connectors 12*a*, 12*b* provide a "right angle" redirection of signal flow from the vertical direction through first connectors 12 into the horizontal direction (underboard) associated with cables 18. In an exemplary embodiment of the disclosure, cables 18 may comprise twinax cables.

Figure 10:
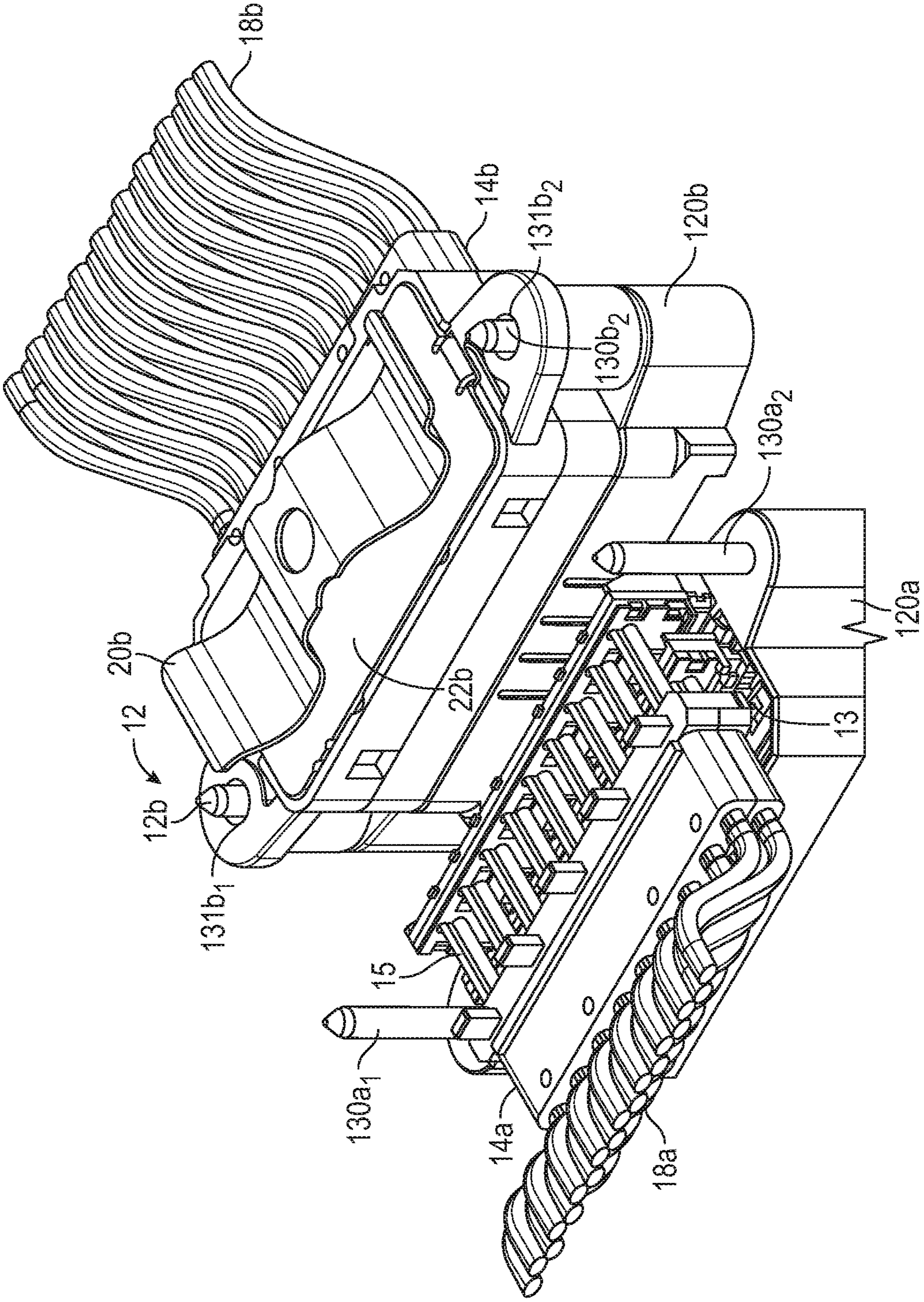
FIG. 10 is an underside isometric view of selected elements of the disclosed connector holder without the housing, illustrating an embodiment of a first connector interior design.

FIG. 10 is an underside view of first connectors 12*a*, 12*b* and second connectors 120*a*, 120*b*, where selected elements have been omitted to clearly show a possible interconnection between the terminals of first connector 12*a* and associated cables 18*a*. As depicted, when a connector holder 10 is positioned within an aperture 2 on a substrate 1, first connector 12*a* may extend upwards above top surface 1*a* of substrate 1, and cables 18 extend across underside 1*b* of substrate 1. Positioning of cable connection modules 14*a*, 14*b* with their respective first connectors 12*a*, 12*b* may be as shown in FIG. 10, where terminals 15 of cable connection module 14*a* are shown in this case as engaging with conductors 13 included within first connector 12*a*.

Also shown in FIG. 10 is biasing element 20*b*, positioned adjacent to a back plate 22*b* of first connector 12*b*. As mentioned above and discussed in detail below, biasing elements 20*a*, 20*b* may be used in various embodiments of the disclosure to provide an upward force against first connectors 12*a*, 12*b*. As depicted in FIG. 10, second 120*a*, 120*b* are also shown, as are locating pins 130*bi*, 130*b*2 that may be used to facilitate an aligned connection between first connectors 12*a*, 12*b* and second connectors 120*a*, 120*b* (first connector 12*b* including alignment apertures 131*bi*, 131*b*2 for accepting locating pins 130*bi* and 130*b*2, respectively).

Figure 11:
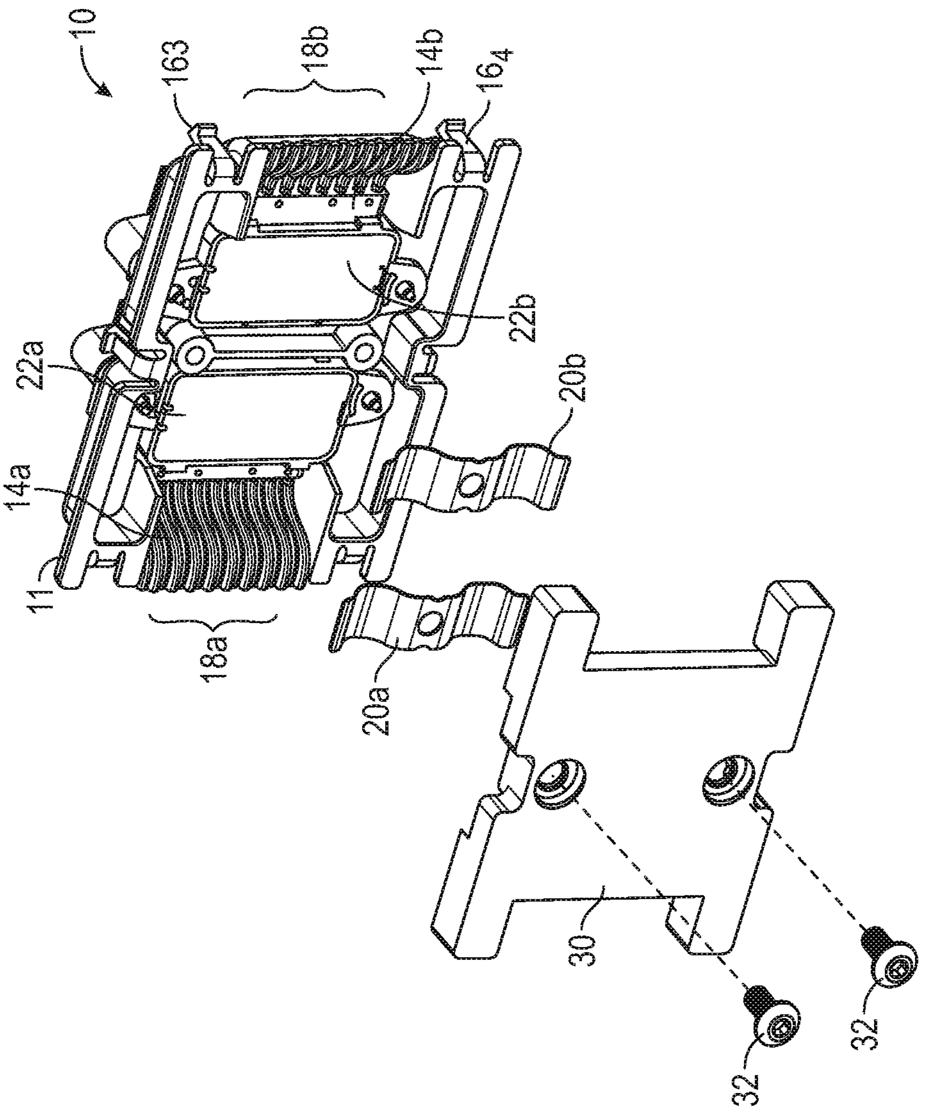
FIG. 11 is another isometric view of the disclosed connector holder, in this case illustrating a biasing element that may be included to support the a connector supported by the connector holder.

FIG. 11 is a partially exploded view from the underside of an exemplary connector holder 10 formed in accordance with this disclosure, showing in this case back plates 22*a*, 22*b* of first connectors 12*a*, 12*b*, respectively. Back plates 22*a*, 22*b* are shown as positioned within housing 11 so that they can be engaged by biasing elements 20*a*, 20*b*. which are supported by a housing plate 30 that is secured to housing 11 (as can be appreciated, but not required, housing plate 30 can be affixed to housing 11 with screws 32 in the manner suggested in FIG. 11). Naturally, housing plate 30 can be secured to housing 11 in a different manner (such as through the use of an adhesive or heat staking, or by being formed integrally with housing 11, or any other desirable manner). As can be appreciated, first connectors 12*a*, 12*b* are configured to be supported in connector holder 10 with the ability to translate in a "z-axis" direction (e.g., in a direction aligned with a mating direction) and are biased in a first direction by a biasing element 20, which is opposite the mating direction. In operation, second connectors 120*a*, 120*b* can press against first connectors 12*a*, 12*b* and biasing element 20*a*, 20*b* can allow for some displacement in the z-axis direction of first connectors 12*a*, 12*b* (once the first and second connectors are mated) while ensuring that there is sufficient biasing force to overcome the mating force needed to ensure that first connectors 12 and second connectors 120 are mated together. For example, if it generally takes ten Newtons of force to ensure that the connectors are mated, then the biasing element can be configured to provide at least ten Newtons of biasing force, and more preferably will provide greater than ten Newtons of biasing force.

Figure 12:
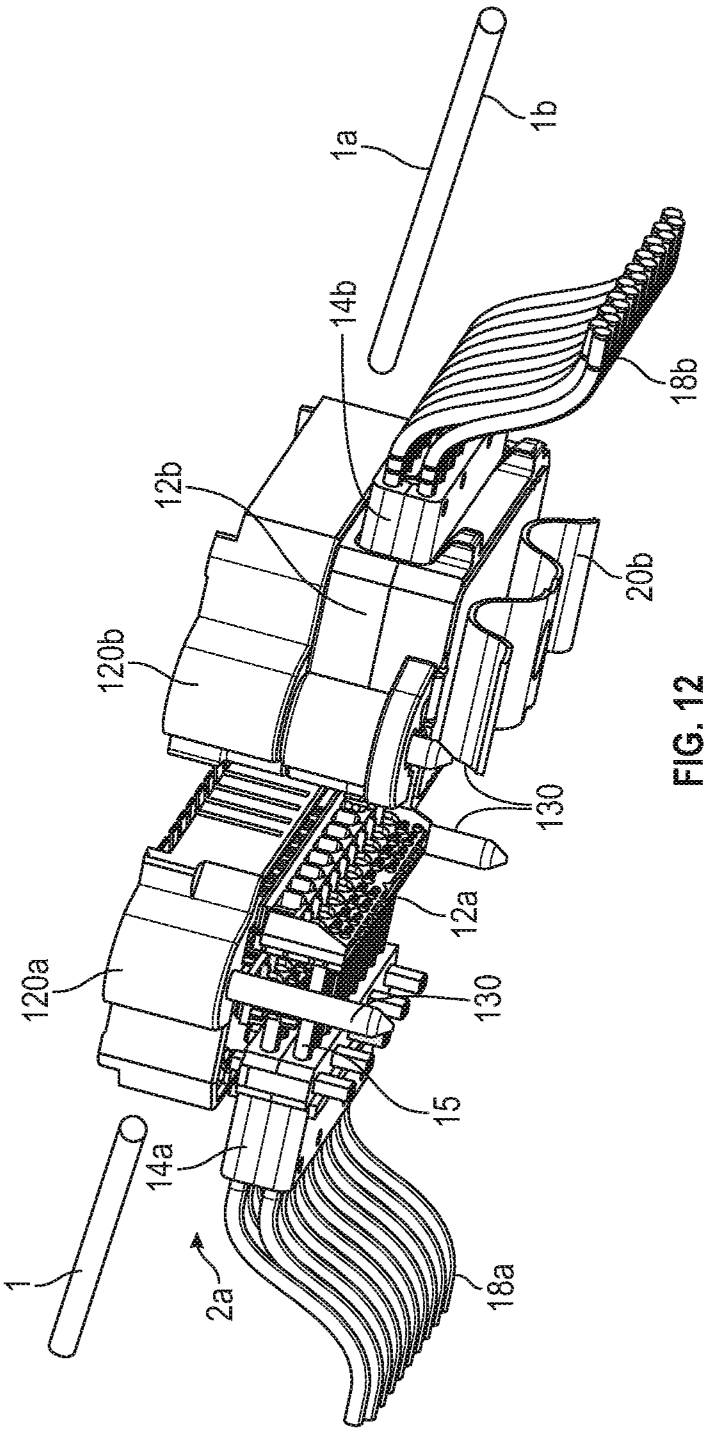
FIG. 12 is an isometric simplified side view of the disclosed connector holder, illustrating the positioning of individual elements of the assembly with respect to an associated circuit board with the housing removed.

FIG. 12 contains an isometric side view of an exemplary embodiment of first connectors 12*a*, 12*b* and second connectors 120*a*, 120*b* as would be supported within connector holder 10 (not shown). The view in FIG. 12 includes an indication of the location of substrate 1 and aperture 2*a*. As can be appreciated, cables 18 extend along underside 1*b* of substrate 1 and thus easily connect to other connector holders arranged on the same substrate (see, for example, FIG. 4 or 6). First connector 12*a* is illustrated in FIG. 12 with surrounding portions of housing 11 removed so as to expose the internal connection elements (see FIG. 10) that provide high speed data connections to cables 18. Second connectors 120*a*, 120*b* are included in the depiction of FIG. 12 as positioned over and attached to first connectors 12*a*, 12*b* of connector holder 10.

Figure 13:
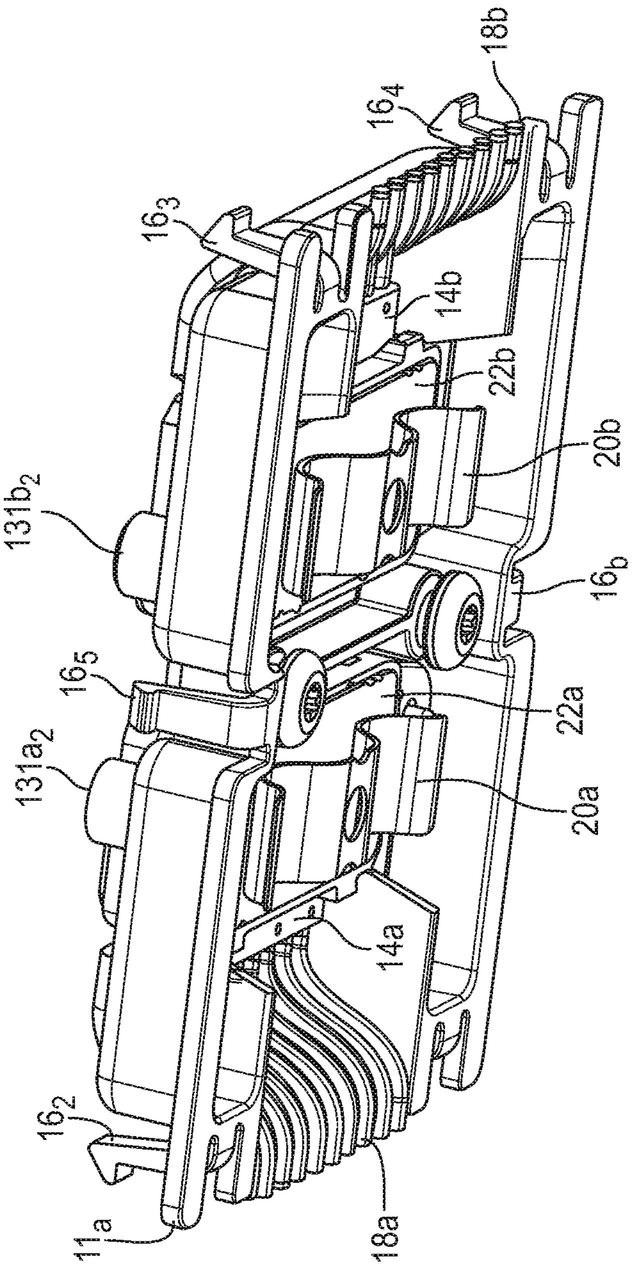
FIG. 13 is an isometric view, similar to FIG. 12, but showing the housing and biasing elements.

The isometric view of FIG. 13 clearly shows the positioning of cable connection modules 14 with respect to first connectors 12. It is noted that this exemplary embodiment of connector holder 10 includes a set of six holding clips $16_1$-$16_6$, with holding clips $16_5$ and $16_6$ positioned at opposing mid-points of connector holder 10 (i.e., between first connectors 12*a* and 12*b*). Naturally, some other number of holding clips can be used, depending on the shape of the aperture and the size and the number of connectors being supported by the housing 11.

Figure 14:
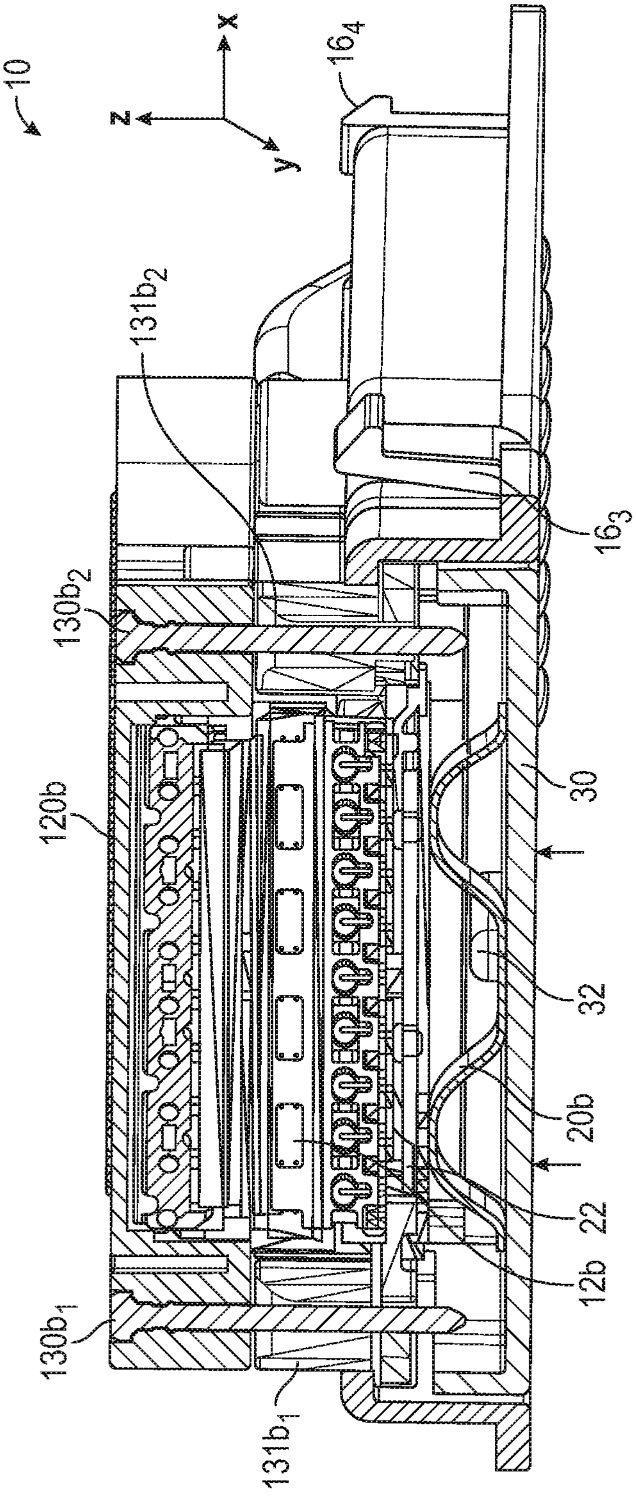
FIG. 14 is a cut-away side view, similar to the view of FIG. 13, indicating the direction of the bias force against the first connector of the connector holder.

FIG. 14 is a cut-away side view of an exemplary connector holder 10 formed in accordance with this disclosure, the cut-away view illustrating an example positioning of a biasing member 20*b* underneath an associated first connector 12*b*. The arrows included in FIG. 14 indicate the direction of the spring force (i.e., Z-direction application) of leaf spring 20*b* against first connector 12*b*. Locating pins 130*bi*, 130*b*2 are also shown in this view as positioned within alignment apertures 131*bi*, 131*b*2 formed in first connector 12*b*.

Figure 15:
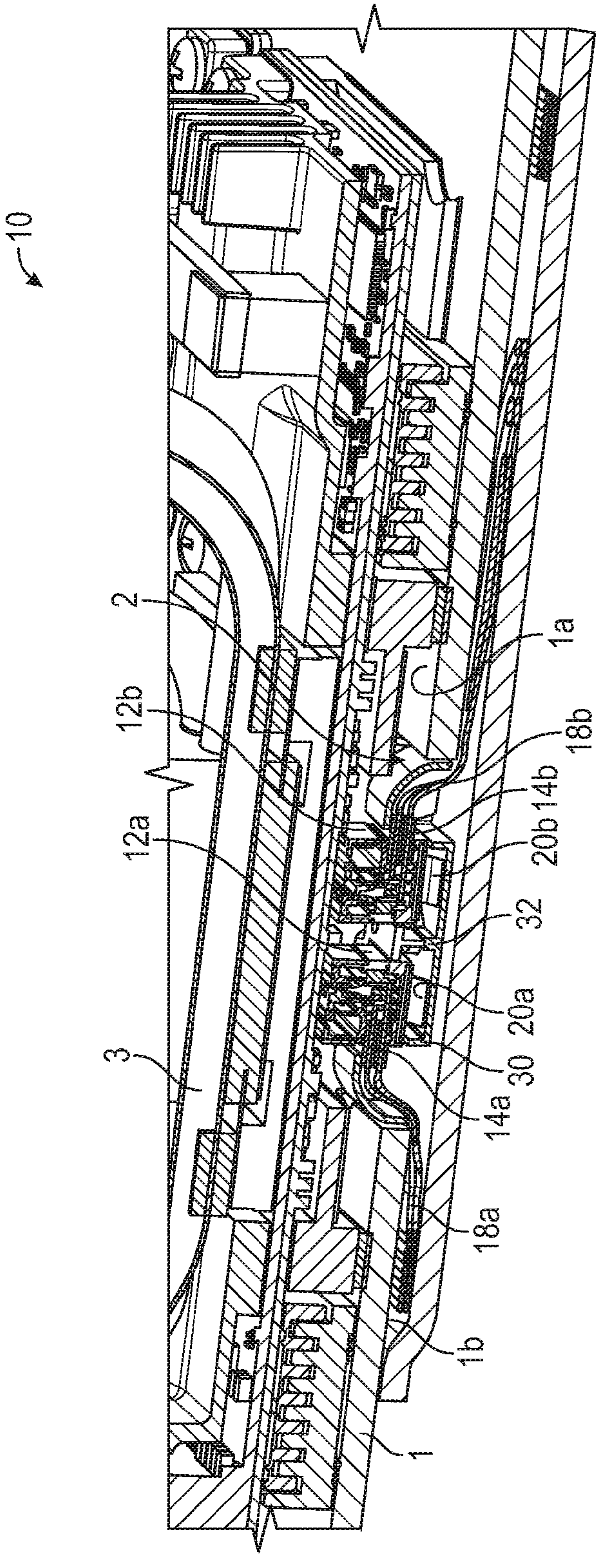
FIG. 15 is a cut-away view of the disclosed connector holder as part of a system and positioned within an aperture formed in a substrate.

A cut-away view of an exemplary connector holder 10 as positioned within an aperture 2 of a substrate 1 is shown in FIG. 15. The underboard positioning of connection modules 14*a*, 14*b* is shown, as well as the underboard location of the attached cables 18*a*, 18*b*, respectively. A lower portion of an attached IC is also shown in FIG. 15 to illustrate a typical arrangement for connecting an IC to a connection holder 10. As can be appreciated, first connectors 12*a*, 12*b* are supported by the connector holder and have engaged second connectors that are electrically connected to the IC.

Figure 16:
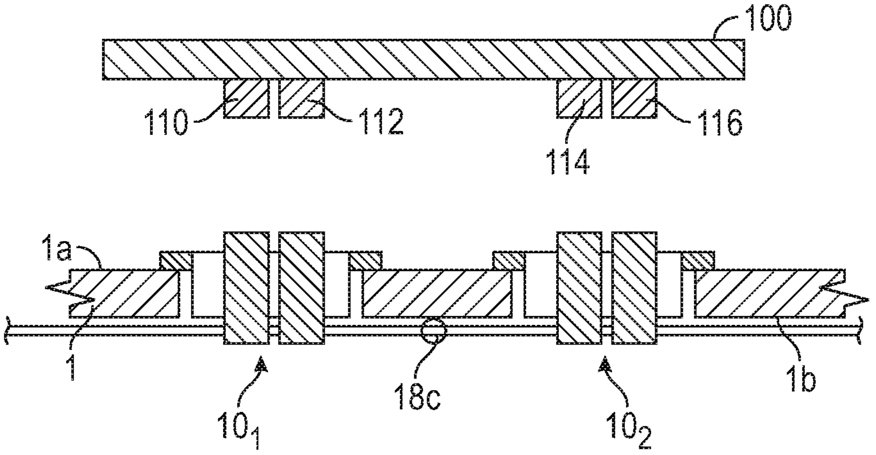
FIG. 16 is a schematic diagram illustrating a connection architecture for mating the disclosed connector holder (as included within a circuit board) with another connection module.
Figure 17:
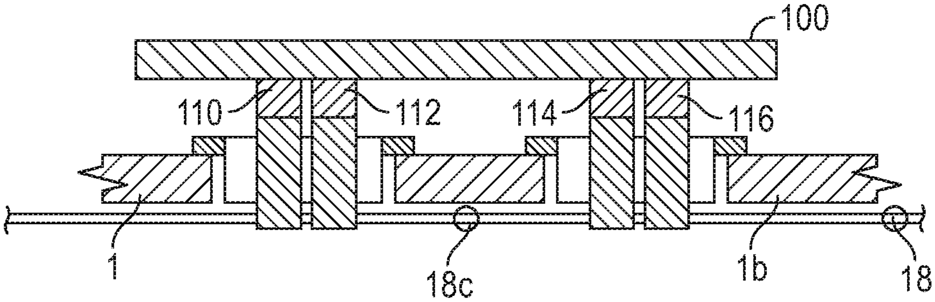
FIG. 17 is another schematic diagram, in this case shown the separate connection module of FIG. 16 in position over and connected with the connector holders disposed in the circuit board.

While the embodiments as described above illustrate the use of a connector holder formed in accordance with this disclosure as a component useful for attaching ICs to a circuit board (or other substrate), it is to be understood that the disclosed connector holder may also be used to provide connections with other elements typically found in second connector assemblies. For example, FIG. 16 is a high-level block diagram illustration of the utilization of the disclosed connector holders to provide interconnection between a substrate 1 and a module board 100. In this example, a pair of connector holders 101 and 102 are depicted, with one set of underboard cables 18*c* used to provide an interconnection between connector holders 101 and 102. Module 100 is shown as including a set of connector assemblies 110, 112, 114, and 116. FIG. 17 illustrates the connection of module board 100 to first connectors 12 of connector holders 101, 102. The depiction of FIGS. 16 and 17 is merely exemplary of one type of board-to-board connection that may be simplified by the use of a connector holder as formed in accordance with the present disclosure.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A connector holder, comprising:

a housing configured to be secured within an aperture formed in a substrate with a top surface and a bottom surface, the housing configured to be inserted into the aperture from the bottom surface;

a first connector disposed within the housing and including a mating interface extending above and away from the top surface in a Z direction among an X direction and a Y direction, the mating interface configured to engage a corresponding second connector and including a plurality of terminals; and a cable connected to the plurality of terminals and configured to exit the housing so as to extend below the bottom surface.

2. The connector holder as defined in claim 1, wherein the housing comprises a plurality of holding clips for securing the connector holder within the aperture.

3. The connector holder as defined in claim 2, wherein the plurality of holding clips comprises a plurality of lever arms configured to engage the aperture, the lever arms configured to allow movement of the connector holder within the aperture.

4. The connector holder as defined in claim 1, wherein the first connector further comprises a plurality of tapered apertures that are configured to accept a plurality of locating pins from a mating connector.

5. The connector holder as defined in claim 1, further comprising a biasing member configured to oppose translation of the first connector in a mating direction when the second connector is mated to the first connector.

6. The connector holder as defined in claim 5, wherein the biasing member comprises a leaf spring disposed along a bottom surface of the first connector.

7. The connector holder as defined in claim 5, wherein the aperture defines an opening in a surface that extends in the X and the Y direction and the housing is configured to translate in the aperture in at least one of the X and the Y direction, and the first connector is configured to translate in the housing in the Z direction, and the biasing member is configured to bias the first connector in a direction extending from the bottom surface to the top surface.

8. The connector holder as defined in claim 1, wherein the cable comprises a plurality of twinax cables.

9. A connector system, comprising:

a substrate with a top and bottom surface, the substrate including an aperture;

a connector holder positioned within the aperture, the connector holder comprising:

a housing configured to be secured within the aperture, the housing configured to be inserted into the aperture from the bottom surface;

a first connector disposed within the housing and including a first mating interface extending above and away from the top surface in a Z direction among an X direction and a Y direction, the mating interface including a plurality of terminals; and a cable connected to the plurality of terminals and configured to exit the housing and extend below the bottom surface; and a second connector in communication with an integrated circuit (IC), the IC supported, at least in part, by the substrate, the second connector mated to the first connector.

10. The connector system of claim 9, wherein the cable is configured to exit the housing substantially parallel with the bottom surface.

11. The connector system of claim 9, wherein the first connector is configured to translate in the housing along an axis aligned with a mating direction and the housing is configured to translate in the aperture in a direction that is substantially perpendicular to the mating direction.

12. The connector system of claim 11, wherein the connector holder includes a biasing element configured to bias the first connector in a direction opposite the mating direction.

13. The connector system of claim 12, wherein the biasing element is a leaf spring positioned between the housing and the first connector.

14. The connector system of claim 9, wherein the first and second connectors are configured to support a data rate of 25 Gbps.

15. The connector system of claim 9, wherein the first connector includes two alignment apertures and the second connector includes two locating pins configured to engage the alignment apertures.

16. The connector system of claim 9, wherein the housing includes a plurality of holding clips and the plurality of holding clips are configured to allow the housing to translate in the aperture in the X and the Y direction.

17. The connector holder of claim 1, wherein the second connector is in communication with an integrated circuit (IC).

18. The connector holder of claim 17, wherein the IC comprises an application specific integrated circuit (ASIC).

19. The connector holder of claim 5, wherein the mating direction corresponds to the Z direction.

20. The connector system of claim 9, wherein the IC comprises an application specific integrated circuit (ASIC).

* * * * *